UNITED STATES PATENT OFFICE.

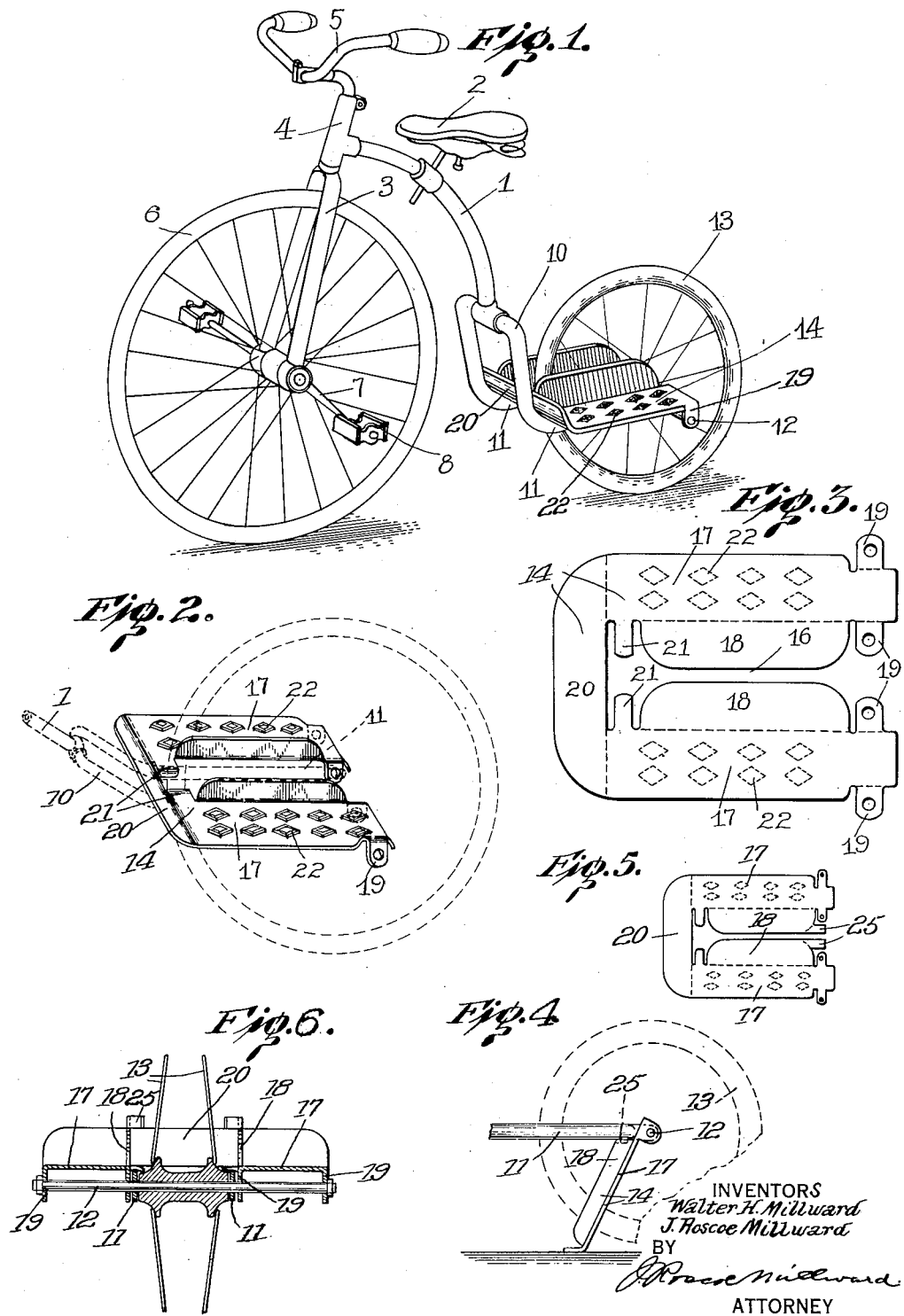

WALTER HELLER MILLWARD AND JOHN ROSCOE MILLWARD, OF NEWARK, NEW JERSEY.

BICYCLE.

1,342,688. Specification of Letters Patent. Patented June 8, 1920.

Application filed January 17, 1919. Serial No. 271,570.

*To all whom it may concern:*

Be it known that we, WALTER HELLER MILLWARD and JOHN ROSCOE MILLWARD, citizens of the United States, residing at Newark, in the county of Essex and State of New Jersey, have invented a new and useful Bicycle, of which the following is a specification.

This invention relates to a toy bicycle and consists of an improved cycle construction and arrangement adapted for use both as a pedal propelled cycle and also as a push vehicle. For the latter purpose and in accordance with our invention, a foot-rest or platform of substantial dimensions is supported at the rear of the cycle frame and in such proximity to the ground as to render the same adaptable and convenient for the rider to stand upon the same for coasting and propelling by pushing the vehicle along by the use of one foot or the other.

As is well known, there is a substantial demand for toy vehicles of the so-called pushmobile type where the rider stands upon a foot platform and these devices have gone into extensive use in the juvenile trade. As will be further recognized, at a certain period in most boys' lives, there comes a keen desire for a so-called two-wheeler or bicycle which, under present market conditions, is only satisfied by the standard bicycle constructions of juvenile size which is moreover standardized along comparatively expensive constructional lines. The improved cycle construction of our invention, as we believe will be readily appreciated, answers the purpose of both the pushmobile cycle and also that of a pedal propelled bicycle thus performing the functions of both types and moreover is readily adapted to be manufactured in the less expensive types of construction, for instance, as now standardized in the velocipede construction wherein hard tires are employed and there is thus furnished a novel vehicle which will, as aforesaid, further answer the purpose of a two-wheeler and by reason of its novelty will not invite comparison with the standard bicycle constructions and can successfully be marketed as a less expensive article.

Further important features of our invention consist in an improved and novel construction of the rear portion of the frame whereby the same is adapted to provide a substantial support for the foot-rest or platform; an improved and inexpensive arrangement and construction of the foot-rest whereby the same may be readily stamped up of a single piece of metal and when so formed will provide a substantial and rigid support and is adapted to be supported at its rear end by the axle of the rear wheel and in the further feature whereby the foot-rest member is pivotally supported upon the rear axle and adapted to be swung rearwardly over the wheel to a position of engagement with the ground so as to act as a supporting stand for the cycle.

A desirable embodiment of the aforesaid and other features of our invention is illustrated in the accompanying drawing wherein the reference characters of the accompanying description are applied to the corresponding parts in the several views.

Referring to the drawings—

Figure 1 is a perspective view illustrating the cycle of our invention constructed in an approved manner;

Fig. 2 is a partial perspective view illustrating our improved manner of forming the foot-rest of a single piece of metal;

Fig. 3 is a plan view of the blank from which the foot-rest or running board is formed;

Fig. 4 is a fragmentary view in side elevation illustrating the manner in which the foot-rest operates as a supporting standard for the cycle;

Fig. 5 is a view similar to Fig. 3 illustrating a slightly modified form; and

Fig. 6 is a vertical cross-sectional view on the plane of the rear axle illustrating the manner of support.

In the drawings, the bicycle is shown comprising the usual frame 1, seat 2 supported thereon, front fork 3 journaled in the usual manner in the head 4 of the frame and having upon its upper end the handle bar or steering lever 5 and having journaled in its lower fork portion the steering or front wheel 6 having the usual propelling cranks and pedals 7 and 8. The rear portion of the frame 1 is suitably forked at 10 and in accordance with our invention has its rear portions 11—11 bent into horizontal position and at its extremities is provided with the usual apertures to receive and support the axle 12 for the rear wheel 13 journaled thereon.

Further, in accordance with our invention, there is associated with the rear wheel or rear portion of the bicycle an elongated foot-rest or running board member 14 which is preferably supported in a horizontal plane at substantially the level of the rear axle. It is further provided with suitable means to prevent the foot slipping thereon and also with means to guard against and prevent the foot coming in contact with the rotating wheel. A desirable construction is here illustrated wherein the foot-rest member is formed in an inexpensive manner by stamping up from a blank of sheet metal of the form as illustrated in Fig. 3.

In so forming the foot-rest, the blank is formed with an elongated central opening 16 of the configuration shown so as to provide opposite bearing or tread portions 17—17 having at their inner edges guard flanges 18—18, at their rear extremities the bearing lip portions 19—19, at the front portion thereof the connecting supporting flange 20 and inwardly directed supporting lips 21—21. In the form of said blank the metal of the tread portions 17—17 may also be desirably perforated at 22 and the marginal walls of said perforations pressed upwardly as indicated in Fig. 2 thereby to present metal on edge for the tread surface so as to resist slipping of the foot thereon. As indicated, the metal is bent upon the dotted lines shown in Fig. 3; the connecting and supporting portion 20 and also the guard flanges 18—18 being bent upwardly and the bearing lips 19—19 being turned downwardly into parallel relation as indicated in Figs. 1 and 2.

As best shown in Fig. 6, the rear axle 12 is elongated and is fitted to perforations in the bearing ears 19—19 of the tread member which is thus pivotally supported thereon substantially to the outer edge of the tread member thus affording a strong and rigid support for the rear portion of the tread. The front portion of the tread or foot-rest member is also rigidly supported clear to the outer edges thereof by means of the upturned portion 20 which provides a desirable supporting means by reason of the metal being turned upwardly or edgewise to the supporting stresses. As illustrated in Fig. 2, the front portion of the tread member is desirably sustained upon the portions 11 of the cycle frame by means of the lips 21—21 being inwardly extended to bear upon the upper surfaces of the frame members 11.

By the improved arrangement disclosed a simple and inexpensive platform tread member is provided and supported in a desirable manner so as to insure rigidity and there is provided a tread member in an arrangement permitting of the cycle being conveniently and with safety used as a push vehicle as aforesaid in addition to its use as a pedal propelled bicycle. The tread member as described, is also designed in a manner not only to afford a substantial foot-rest as required, but is further provided with elongated inner guards to prevent the foot coming in contact with the wheel and as disclosed, a substantial portion of the tread members is rigidly supported upon the frame and in advance of the rear wheel axle.

As a further feature and advantage of our invention which will be understood by reference to Fig. 4 of the drawing, by reason of the tread portion being pivotally supported upon the rear axle, and by reason of the width thereof, the same may be swung about said axle as a pivot to engage with the ground and in that position act as a supporting standard for the cycle.

As shown in the Figs. 4 and 5, the tread member may desirably be modified so as to have an inturned lug 25 adapted to engage with the under side of the frame bars 11 to provide additional rigidity when acting as a supporting standard.

As will be readily understood, our invention is subject to various modifications without departing from the spirit thereof and it is therefore intended that all matter hereinafter shall be interpreted as illustrative and not in a limiting sense.

We claim:

1. A bicycle comprising a frame, a front wheel suitably journaled in swivel arrangement therein and having propelling cranks connected therewith, said frame having its members rearwardly extending in substantially horizontal plane, a rear axle fitted to said forked members, a rear wheel journaled on said axle, elongated platform tread members associated with the rearward portion of the frame and extending longitudinally thereof and arranged on opposite sides of the rear wheel and provided on their inner side edges with substantially vertical guard flanges, and said tread members being supported at their rearward edges upon said axle and adapted to bear upon the frame members at their forward portions, substantially as described.

2. A bicycle comprising a frame, a front wheel suitably journaled in swiveled arrangement therein and having propelling cranks connected therewith, said frame having a rear fork having its members rearwardly extending in a horizontal plane, a rear wheel journaled in the rear fork members and an elongated horizontally arranged platform tread member associated with the rearward portion of the frame, said tread member being integrally formed of a single sheet of metal stamped up to form longitudinally extending tread portions on opposite sides of the rear wheel and with a forward up-turned connecting portion adapted to connect and support the forward ends of said tread members, substantially as described.

3. A bicycle comprising a frame, a front wheel suitably journaled in swiveled arrangement therein and having propelling cranks connected therewith, said frame having a rear fork having its members rearwardly extending in a horizontal plane, a rear wheel journaled in the rear fork members and an elongated horizontally arranged platform tread member associated with the rearward portion of the frame, said tread member being integrally formed of a single sheet of metal stamped up to form longitudinally extending tread portions on opposite sides of the rear wheel and with a forward-upturned connecting portion adapted to connect and support the forward ends of said tread members, and with up-turned longitudinally extending guard flanges formed at the inner edges of said tread portions, substantially as described.

4. A bicycle comprising a frame, a front wheel suitably journaled in swiveled arrangement therein and having propelling cranks connected therewith, said frame having a rear fork having its members rearwardly extending in a horizontal plane, a rear wheel journaled in the rear fork members and an elongated horizontally arranged platform tread member associated with the rearward portion of the frame, said tread member being integrally formed of a single sheet of metal stamped up to form longitudinally extending tread portions on opposite sides of the rear wheel and with a forward up-turned connecting portion adapted to connect and support the forward ends of said tread members, and said tread portions at their rearward edges being formed to bear upon the rear axle substantially to the outer edges thereof, substantially as described.

5. A bicycle comprising a frame, a front wheel suitably journaled in swiveled arrangement therein and having propelling cranks connected therewith, said frame having a rear fork having its members rearwardly extending in a horizontal plane, a rear wheel journaled in the rear fork members and an elongated horizontally arranged platform tread member associated with the rearward portion of the frame, said tread member being integrally formed of a single sheet of metal stamped up to form longitudinally extending tread portions on opposite sides of the rear wheel and with a forward upturned connecting portion adapted to connect and support the forward ends of said tread members, and with upturned longitudinally extending guard flanges formed at the inner edges of said tread portions, said tread member at its rearward portion being pivotally supported upon the rear axle and adapted to swing thereon into position to act as a supporting standard and inturned lugs formed on the guard flanges adapted to engage the under side of the fork members when in the latter position, substantially as described.

6. A juvenile bicycle having its rear fork members rearwardly extending in a substantially horizontal plane, a rear wheel of relatively small diameter journaled in said rear fork members, and elongated platform tread members associated with the rearward portion of the frame and extending longitudinally thereof, said tread members being arranged on opposite sides of the rear wheel and provided on their inner side edges with substantially vertical guard flanges and arranged to be supported at their rearward edges upon the rear axle and adapted to bear upon the frame members at the forward portions, substantially as described.

7. As a new article of manufacture a juvenile bicycle adapted to be ridden as a bicycle or as a pushmobile comprising a frame, a front wheel suitably journaled in swivel arrangement therein and provided with propelling cranks, a rear wheel suitably journaled at the rear portion of the frame and of comparatively small diameter to provide for clearance thereover, and elongated platform tread members supported upon the frame at the rearward portion thereof at substantially the height of the rear wheel axle, substantially as described.

8. As a new article of manufacture a juvenile bicycle adapted to be ridden as a bicycle or as a pushmobile comprising a frame, a front wheel suitably journaled in swivel arrangement therein and provided with propelling cranks, a rear wheel suitably journaled at the rear portion of the frame and of comparatively small diameter to provide for clearance thereover and elongated platform tread members supported upon the frame at the rearward portion thereof at substantially the height of the rear wheel axle, said tread members being formed integrally of one piece and pivotally supported to swing into position to act as a supporting standard.

In testimony whereof we have signed our names to this specification.

WALTER HELLER MILLWARD.
J. ROSCOE MILLWARD.